(12) United States Patent
Collins et al.

(10) Patent No.: US 8,672,225 B2
(45) Date of Patent: Mar. 18, 2014

(54) CONVERTIBLE BARCODE READER

(75) Inventors: Donald Collins, Buford, GA (US); Peter Barron, Tucker, GA (US); Paul Detwiler, Lawrenceville, GA (US); Steven Hammer, Lilburn, GA (US); Dave Gregerson, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 102 days.

(21) Appl. No.: 13/363,009

(22) Filed: Jan. 31, 2012

(65) Prior Publication Data

US 2013/0193208 A1    Aug. 1, 2013

(51) Int. Cl.
*G06K 7/00* (2006.01)
(52) U.S. Cl.
USPC ....... 235/462.01; 235/435; 235/439; 235/454

(58) Field of Classification Search
None
See application file for complete search history.

(56) References Cited

U.S. PATENT DOCUMENTS 8,365,998 B1 * 2/2013 Gregerson et al. ............ 235/440

* cited by examiner

*Primary Examiner* — Michael G Lee
*Assistant Examiner* — Matthew Mikels
(74) *Attorney, Agent, or Firm* — Paul W. Martin; Harden E. Stevens, III

(57) ABSTRACT

A convertible barcode reader which includes different configurations for self-service operation and assisted-service operation. An example convertible barcode reader includes a first housing portion including a first barcode reader engine, and a second housing portion including a second barcode reader engine. The second housing portion is moveable between a first position recessed within the first housing portion and a second position extending from the first housing portion.

20 Claims, 3 Drawing Sheets

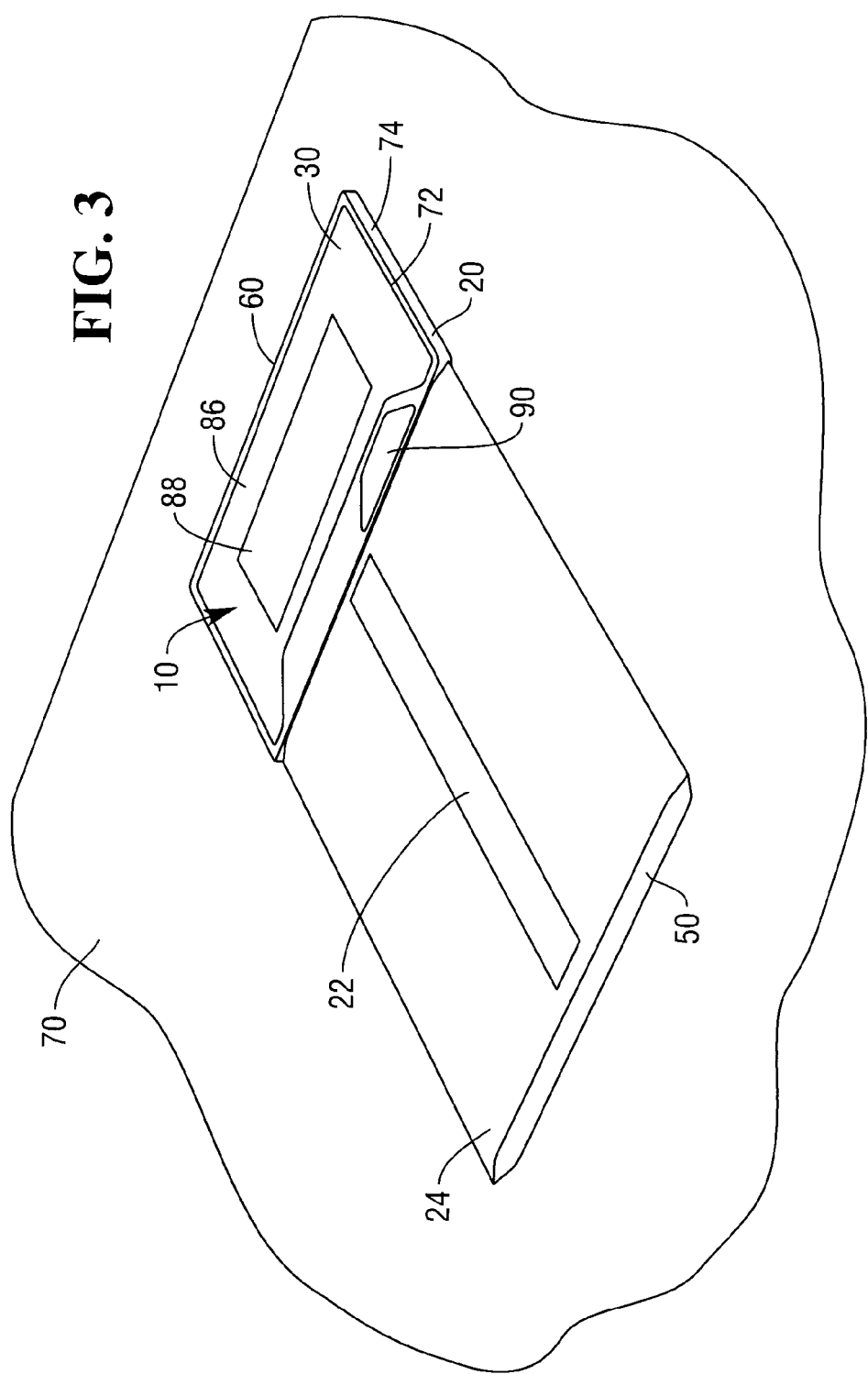

– 1 –
CONVERTIBLE BARCODE READER

BACKGROUND

The present invention relates to barcode readers, and more specifically to a convertible barcode reader.

Barcode readers are well known for their usefulness in retail checkout and inventory control. They typically include a laser diode, a mirrored spinner, a plurality of pattern mirrors, a collector, and a detector. In particular, the function of the pattern mirrors is to direct scanning beams from the mirrored spinner out of the scanner to form a scan pattern. The pattern mirrors also direct light reflected from an item bearing a barcode label to the mirrored spinner.

Some barcode readers used in checkout environments are capable of reading a barcode on an item regardless of the orientation of the item. These multi-aperture barcode readers may include a horizontal aperture that is substantially flush with the checkout counter and a vertical aperture in a "tower" portion that extends upwards from the checkout counter.

In some checkout environments, there is a need to convert a checkout counter from an assisted service checkout counter to a self-service checkout counter without changing customer paths. The use of a multi-aperture barcode reader may complicate this conversion, since the tower portion is located on a customer side of the checkout counter, interfering with customer use of the barcode reader.

Therefore, it would be desirable to provide a convertible barcode reader which overcomes this problem.

SUMMARY

In accordance with the teachings of the present invention, a convertible barcode reader is provided.

An example convertible barcode reader includes a first housing portion including a first barcode reader engine, and a second housing portion including a second barcode reader engine. The second housing portion is moveable between a first position recessed within the first housing portion and a second position extending from the first housing portion.

The second housing portion is in the first position for self-service operation, and is in the second position for assisted-service operation.

When in the first position for self-service operation, the second housing portion is recessed and does not obstruct customer use during barcode reading, weighing, deactivation of product security labels, RFID tag reading, or other tasks involving the barcode reader.

BRIEF DESCRIPTION OF THE DRAWINGS

FIG. 3 is a perspective view of the example convertible barcode reader in a second configuration.

DETAILED DESCRIPTION

Figure 1:
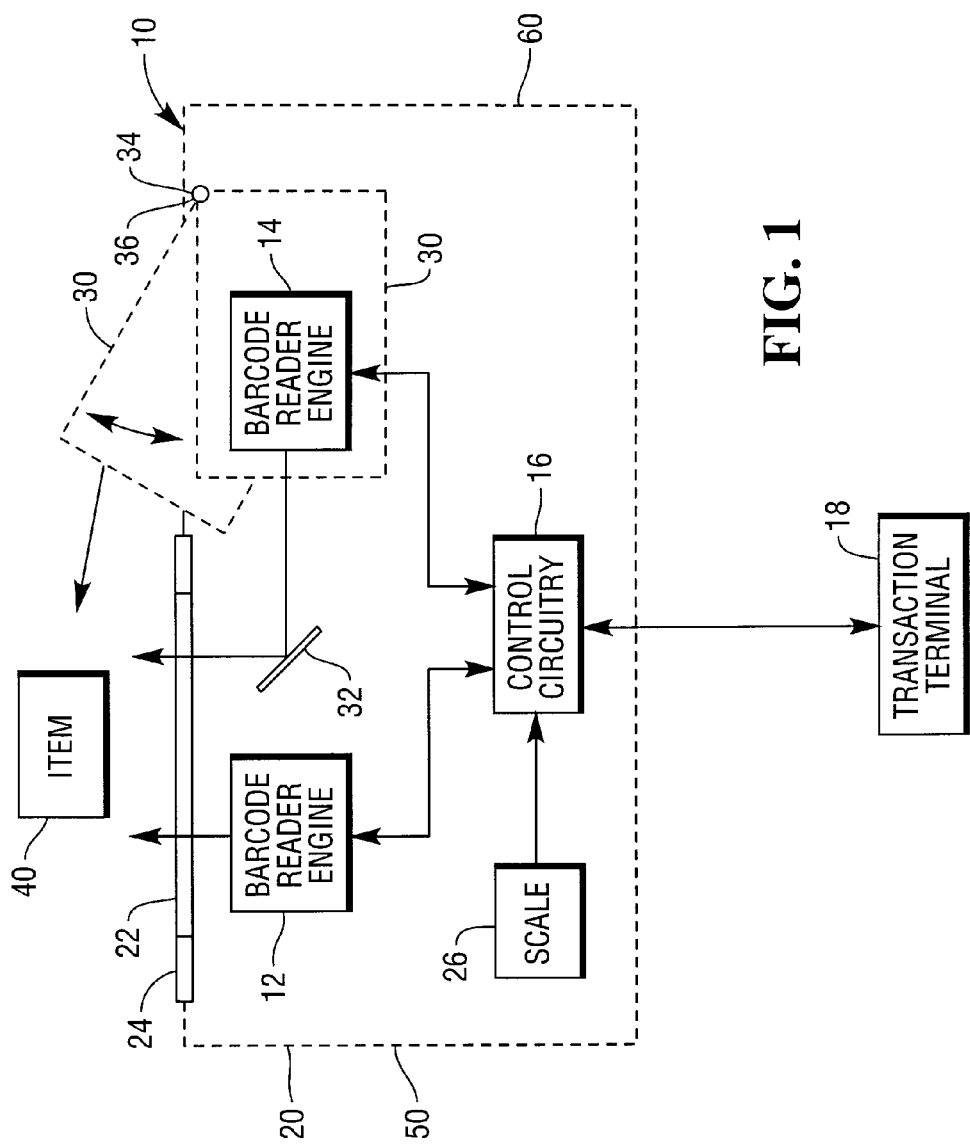
FIG. 1 is a block diagram of an example convertible barcode reader.

Turning now to FIG. 1, barcode reader 10 includes barcode reader engine 12 and barcode reader engine 14.

Barcode reader engine 12 is located in a first housing portion 20 of barcode reader 10 and primarily reads barcodes through a substantially horizontal aperture 22 in the first portion. Substantially horizontal aperture 22 may be flush or substantially flush with a checkout counter. In an example embodiment, aperture 22 is located within a scale weigh plate 24 associated with a scale 26 in barcode reader 10. Barcode reader engine 12 may be capable of reading a barcode appearing on a bottom, leading, trailing, assistant, or customer side of item 40, or anywhere between.

Barcode reader engine 14 is located in a second housing portion 30 of barcode reader 10 which is movable between a first position recessed within first housing portion 20 and a second position above first housing portion 20. When the second housing portion 30 is in the first position, barcode reader 14 reads barcodes through substantially horizontal aperture 22. An example embodiment includes a folding mirror 32 for directing light from above horizontal aperture 22 to barcode reader engine 14. Alternatively, barcode reader engine 14 may be disabled.

When second housing portion 30 is in the second position, barcode reader 14 reads barcodes directly from item 40. In the second position, barcode reader engine 14 may be capable of reading a barcode appearing on a top, leading, trailing, or customer side of the item, or anywhere between.

In an example embodiment, second housing portion 30 may be rotated about hinge 34 to accomplish repositioning. In another example embodiment, second housing portion 30 may move in a linear direction perpendicular to the checkout counter and first housing portion 20, vertically upwards and downwards, rather than rotating about a hinge, to accomplish repositioning. Other embodiments are also envisioned.

Barcode reader 10 may include a latch mechanism for repositioning second housing portion 30. In the example embodiment, second housing portion 30 may be biased, for example, by a spring 36 around hinge 34, towards a position above housing portion 20. The latch mechanism retains second housing portion 30 within first housing portion 20.

In alternative embodiments, a motor or other repositioning device may be used instead of a latch to raise and/or lower second housing portion 30.

Example barcode reader engines 12 and 14 may include any type of barcode reader. Barcode reader engines 12 and 14 may be the same or different types of barcode readers. Barcode reader engines 12 and 14 may be capable of pass-by reading of barcodes on items 40 as an operator moves items within fields of view or scanning zones of barcode reader engines 12 and 14.

In one example embodiment, barcode reader engine 12 is an optical barcode reader engine with one or more lasers, mirror spinners, pattern mirrors, collectors, and detectors. The laser generates a laser beam which strikes the mirrored spinner. The mirrored spinner sweeps the laser beam across the pattern mirrors, which direct the laser beam through horizontal aperture 22 to create scan lines. The laser light reflects from an item with a barcode through horizontal aperture 22 towards the pattern mirrors. The pattern mirrors direct the reflected light towards the mirrored spinner, which further directs the reflected light towards a collector between the laser and the mirrored spinner. The collector directs the reflected light towards a detector, which converts the reflected light into electrical signals based upon the intensity of the reflected light.

In the example embodiment, barcode reader engine 14 may also include an optical barcode reader engine with one or more lasers, or a portion of an optical barcode reader, such as pattern mirrors. In another example embodiment, barcode reader engine 14 may include an imager, such as a charge coupled device or camera. The imager captures an image of an item with a barcode.

In one example embodiment, folding mirror 32 may be limited to redirecting light from above horizontal aperture 22 to barcode reader engine 14 when second housing portion 30 is recessed within first housing portion 20. In another example embodiment, folding mirror 32 may serve another or alternative purpose as a pattern mirror of barcode reader engine 12 when second housing portion 30 is above first housing portion 20. Folding mirror 32 may or may not require repositioning or flipping. If repositioning is required, releasing the latch mechanism may also result in repositioning of folding mirror 32.

Control circuitry 16 decodes barcode information from barcode engines 12 and 14 and sends the barcode information to transaction terminal 18. Control circuitry 16 also sends weight information from scale 26 to transaction terminal 18.

In an alternative embodiment, each of barcode engines 12 and 14 may include its own barcode decoding circuitry. Each of barcode engines 12 and 14 may operative independently to send barcode information, or barcode and weight information, to transaction terminal 18.

Barcode reader 10 may additionally include other peripherals, such as a product security label deactivation unit and a radio frequency identification (RFID) tag reader. For example, a product security label deactivation unit may include a magnetic sense and deactivate coil located in first housing portion 20 under weigh plate 24. The RFID tag reader may include an antenna under or incorporated into weigh plate 24.

Transaction terminal 18 is located at a checkout counter that is configurable between self-service operation and assisted-service operation. In an assisted-service mode of operation, an assistant is located adjacent side 50 of barcode reader 10. Second housing portion 30 and barcode reading engine 14 are in the second position, above first housing portion 20. Barcode reader engine 14 reads barcodes directly from item 40.

In a self-service mode of operation, a customer is located on side 60 of barcode reader 10. Second housing portion 30 is in the first position, recessed within first housing portion 20. Thus, second housing portion 30 does not obstruct customer use during barcode reading, weighing, deactivation of product security labels, or RFID tag reading. Barcode reader 14 reads barcodes through substantially horizontal aperture 22 using folding mirror 32.

Figure 2:
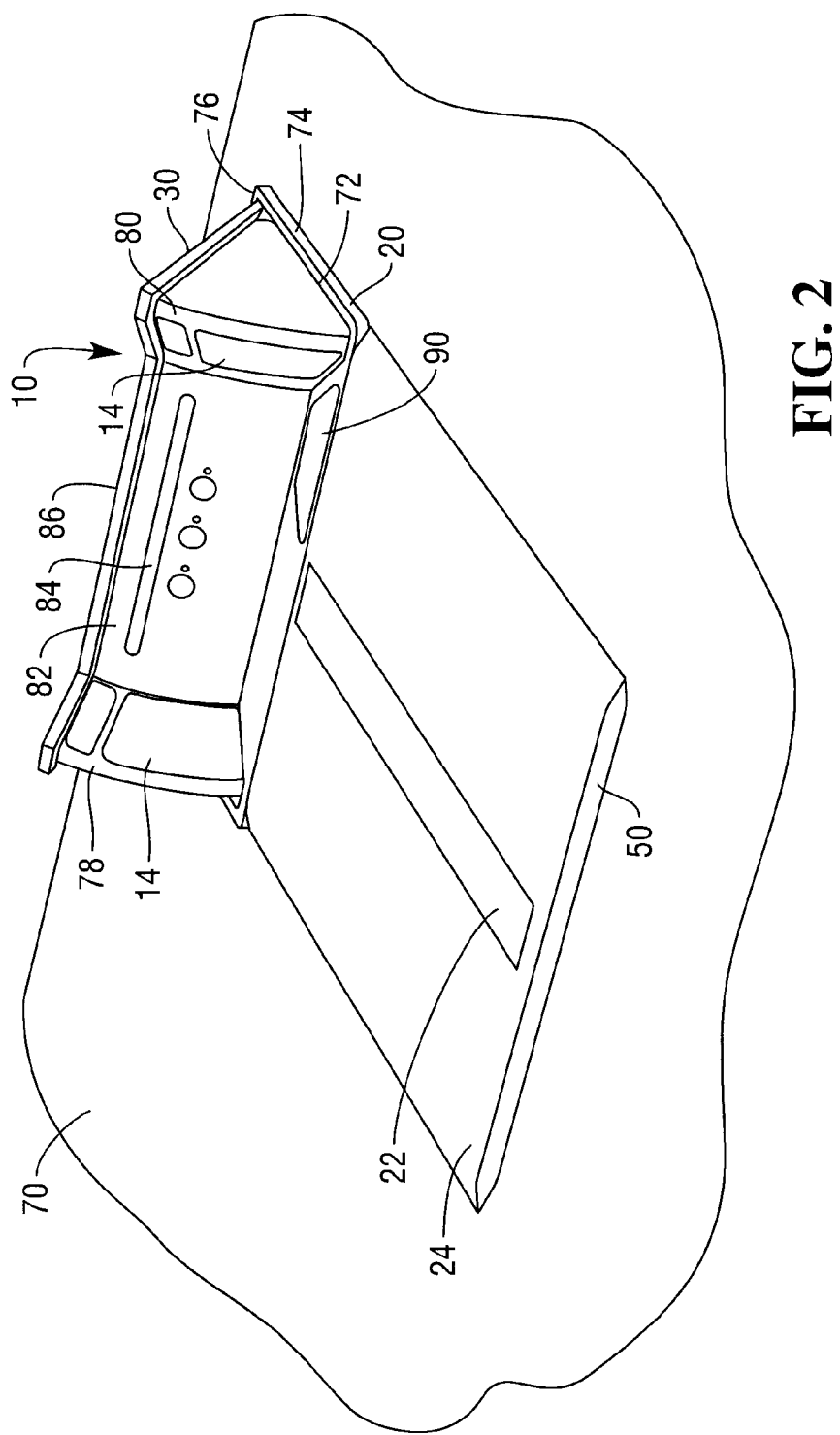
FIG. 2 is a perspective view of the example convertible barcode reader in a first configuration.

Turning now to FIGS. 2-3, an example embodiment of barcode reader 10 is illustrated.

With reference to FIG. 3, first housing portion 20 is substantially recessed within checkout counter 70. Weigh plate 24 and top surface 86 are substantially flush with the top surface of checkout counter 70. The perimeter of second housing portion 30 is defined by aperture 72 between housing portion 30 and frame 74 of first housing portion 20.

Depression of button 90 releases second housing portion 30 from the first position for assisted-service operation. In an example embodiment in which the repositioning device is a latch, spring bias causes second housing portion 30 to rotate upwards and remain in the second position above first housing portion 20 (FIG. 2). To control opening speed, an operator may press slightly down on top surface 86 over second housing portion 30 until second housing portion 30 reaches the opened position.

With reference to FIG. 2, rotation of housing portion 30 exposes face 78, face 80, and face 82. Edge 76 remains adjacent frame 74. Faces 78 and 80 include barcode reader engines 14. Faces 78 and 80 are oriented inwards at predetermined angles so as to face towards an approximate center of weigh plate 24. In this example, barcode reader engines 14 are imagers. The angles are sufficient to capture images of items 40 located over weigh plate 24. Example angles may be about forty-five degrees relative to face 82. Face 82 includes indicators and controls 84.

To configure barcode reader 10 for self-service operation, an operator presses down on top surface 86 over second housing portion 30 until latch mechanism engages. Afterwards, top surface 86 is flush with frame 74 (FIG. 3).

In other example embodiments, button 90 may operate a motor to electrically raise and lower second housing portion 30.

In an example embodiment, barcode reader 10 additionally includes a customer display 88 in top surface 86. Display 88 may include a liquid crystal display (LCD). Display 88 may be operational to display transaction information to a customer during both self-service and assisted-service modes of operation. During self-service operation, display 88 is oriented horizontally. During assisted-service operation, top surface 86 is oriented at an angle that is still low enough to allow display 88 to be viewed by a customer during assisted-service operation. An example angle is about sixty degrees from the top surface of checkout counter 70.

Although the present invention has been described with particular reference to certain preferred embodiments thereof, variations and modifications of the present invention can be effected within the spirit and scope of the following claims.

What is claimed is:

1. A convertible barcode reader comprising:
 a first housing portion including a first barcode reader engine;
 a second housing portion including a second barcode reader engine;
 wherein the second housing portion is moveable between a first position recessed within the first housing portion and a second position extending from the first housing portion.

2. The barcode reader of claim 1, wherein the first barcode reader engine comprises an optical barcode scanner.

3. The barcode reader of claim 1, wherein the first barcode reader engine comprises an imaging barcode reader.

4. The barcode reader of claim 1, wherein the second barcode reader engine comprises an optical barcode scanner.

5. The barcode reader of claim 1, wherein the second barcode reader engine comprises an imaging barcode reader.

6. The barcode reader of claim 1, further comprising a scale including a weigh plate on the first housing portion containing an aperture.

7. The barcode reader of claim 1, wherein the second housing portion is coupled to the first housing portion at a hinge, and wherein the second housing portion rotates between the first and second positions about the hinge.

8. The barcode reader of claim 1, wherein the second housing portion moves linearly between the first and second positions.

9. The barcode reader of claim 1, wherein the barcode reader operates in a self-service mode of operation when the second housing portion is in the first position.

10. The barcode reader of claim 1, wherein the barcode reader operates in an assisted-service mode of operation when the second housing portion is in the second position.

11. A convertible barcode reader comprising:
 a first housing portion including a first barcode reader engine, including a laser barcode scanner;
 a scale in the first housing portion, including a weigh plate having an aperture through which scanning light beams from the optical barcode scanner pass;

a second housing portion including a second barcode reader engine;

wherein the second housing portion is moveable between a first position recessed within the first housing portion for a self-service mode of operation and a second position extending from the first housing portion for an assisted-service mode of operation.

12. The barcode reader of claim 11, wherein the second barcode reader engine comprises a portion of an optical barcode reader.

13. The barcode reader of claim 11, further comprising a button for initiating movement of the second housing portion.

14. The barcode reader of claim 13, wherein the button operates a latch.

15. The barcode reader of claim 13, wherein the button operates a motor.

16. The barcode reader of claim 11, further comprising a third barcode reader engine in the second housing portion, wherein the second and third barcode reader engines comprise first and second imaging barcode readers.

17. The barcode reader of claim 16, wherein the first housing portion further comprises an assisted-service end and a self-service end, and wherein the second housing portion further comprises a side facing the assisted-service end including a first face substantially facing a first direction towards the assisted-service end, a second face containing the first imaging barcode reader on one side of the first face substantially facing a second direction at a first angle towards the aperture, and a third face containing the second imaging barcode reader on another side of the first face substantially facing a third direction at a second angle towards the aperture.

18. The barcode reader of claim 11, wherein the second housing portion further comprises a top surface including a display.

19. A method of configuring a barcode reader comprising:

moving a second housing portion within a first housing portion from a raised second position for an assisted-service mode of operation to a recessed first position for a self-service mode of operation, wherein the first housing portion contains a first barcode reader engine which captures barcode information through an aperture in the first housing portion, and wherein the second housing portion contains a second barcode reader engine; and enabling capturing of the barcode information using the second barcode reader engine through the aperture when the second housing portion is in the recessed first position.

20. The method of claim 19, further comprising:

moving the second housing portion from the recessed first position for the self-service mode of operation to the raised second position for an assisted-service mode of operation.

* * * * *